United States Patent [19]

Johnson

[11] 4,043,441
[45] Aug. 23, 1977

[54] MOBILE PUMP
[75] Inventor: John R. Johnson, Arcadia, Calif.
[73] Assignee: Royal Industries, Inc., Pasadena, Calif.
[21] Appl. No.: 630,207
[22] Filed: Nov. 10, 1975
[51] Int. Cl.² ............................................. B65G 33/14
[52] U.S. Cl. .................................. 198/317; 198/584; 198/616; 214/83.26
[58] Field of Search ...................... 198/64, 71, 73, 74, 198/213, 233, 317, 550, 616, 584; 214/509, 83.26, 83.32; 417/234

[56] References Cited
U.S. PATENT DOCUMENTS

| 1,073,054 | 9/1913 | Legris | 198/233 X |
|---|---|---|---|
| 2,545,141 | 3/1951 | Escher | 198/213 |
| 2,738,960 | 3/1956 | Hoffstetter | 198/64 X |
| 3,227,261 | 1/1966 | Hawley | 198/64 |
| 3,253,695 | 5/1966 | Gooding | 198/64 |
| 3,279,383 | 10/1966 | Smith | 417/234 |
| 3,367,280 | 2/1968 | Bennett et al. | 417/234 |
| 3,498,483 | 3/1970 | Meharry | 214/83.26 |
| 3,575,306 | 4/1971 | Obermeyer et al. | 198/64 X |
| 3,580,384 | 5/1971 | Pingree | 198/64 |
| 3,768,784 | 10/1973 | Spellman, Jr. | 214/83.26 X |

Primary Examiner—Evon C. Blunk
Assistant Examiner—Richard K. Thomson
Attorney, Agent, or Firm—Edward J. DaRin

[57] ABSTRACT

A mobile pump for pumping moist compressible materials such as plaster, concrete, mortar and the like constructed integrally with a motor vehicle to be powered and transported thereby. The pump is provided with integral conveying apparatus redefining the material loading positions to lower elevations than possible with present day mobile pumps without modifying the conventional frame work or vehicle beds. The conveying apparatus may be a power driven auger rotatably secured to the pump proper for defining convenient loading positions for present day concrete trucks or the like.

1 Claim, 3 Drawing Figures

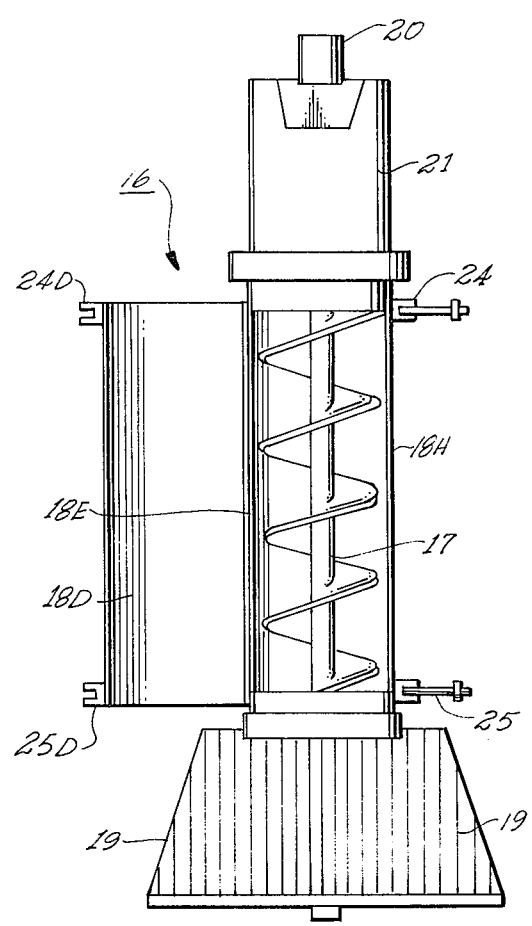

MOBILE PUMP

DISCLOSURE OF THE INVENTION

This invention relates to a mobile pump and more particularly to an improved apparatus to facilitate the loading of moist, compressible materials such as plaster, concrete, mortar and the like from a supply source, such as a "ready mix" concrete truck, into the mobile pump.

At the present time there is in use pumping apparatus for pumping moist, compressible materials such as plaster, concrete, mortar and the like. These pumps have been rendered mobile by integrally constructing them onto to a conventional motor vehicle or "pick-up" truck from which they are powered and transported from job site to job site. One such mobile pump for pumping concrete and the like is disclosed in U.S. Pat. No. 3,279,382 granted on Oct. 18, 1966. At the present time, one of the problems with existing pumps of this type is the location of the material hopper for conveying the material to be pumped from a source for such material (such as the ready-mix truck) into the pump. With respect to the mobile concrete pumps that are presently available, the pumps are charged by receiving the discharge of the wet concrete pump from a ready-mix truck. The material hopper will discharge the material through gravity into the pump. As a result of constructing the pump integral with the motor vehicle, the hopper for receiving the material to be pumped must by arranged at some distance above ground. This is a problem because of the present day construction of the ready-mix trucks and their discharge apparatus they cannot discharge their load, since the discharge apparatus for the truck is lower than the top of the hopper for the pump. This problem is being continuously hassled with in conjunction with the design of such concrete pumps, particularly when they are constructed integrally with a truck. Various compromising features have been proposed and used in order to keep the hopper as low as possible above ground level. One prior art technique for solving this problem resorts to the modification of the truck bed so as to allow the pump to be mounted at a lower point than is possible with the unmodified truck bed. This, of course, introduces an expensive cost factor into the manufacture of such mobile truck mounted pumps. It is preferred and more economical to solve the problem of the discharge height or conveyance of the material to be pumped into the pump without modifying the truck bed.

The present invention provides an improved and efficient mobile pump for pumping moist, compressible materials such as plaster, concrete, mortar and the like from a supply source such as a ready mix truck without resorting to modifying the truck bed or any other substantial modifications to the structure of the pump per se. The present invention provides an improved mobile pump for pumping such moist, compressible materials as concrete through the provision of the material conveying apparatus constructed integral with the pump for moving the material to be discharged into the pump readily and efficiently from a point below the material entry port of the pump proper and at elevations above ground heretofore not thought to be practicable. The conveying apparatus may be an auger-type conveying arrangement constructed integral with the pump for effectively conveying the material into the material chamber of the pump and remixing it during its transit time in the conveyor. The conveyor may be readily adjusted in accordance with the particular characteristics of the discharge apparatus for the source of the material to be pumped, such as the varying heights employed in commercially available ready-mix trucks, and similar material mixing and supplying apparatus. Certain prior art type apparatus that have been necessary in prior art pumps have been eliminated through the implementation of the concept of the present invention since their functions have been incorporated into the function of the conveying apparatus of the present invention. The conveying apparatus is also constructed and defined to allow ready access to the conveying apparatus so that it may be cleaned and washed before the moist compressible materials harden.

From a structural standpoint, the concept of the present invention is embodied into a mobile pump for pumping a moist compressible material such as concrete. The portable pump for this purpose is mounted on a motor vehicle having a power unit for propelling the vehicle and adapted for powering the pump while also functioning as a transport means for the pump. The means for charging the pumping apparatus with the material to be pumped includes a cone-shaped hopper secured to the pump and extending upwardly for charging the pumping apparatus with the material to be pumped. Power driven conveying means are movably secured to the hopper for receiving the material to be pumped and conveying it into the cone-shaped hopper. The conveying means is adapated to be movable relative to the hopper for defining a convenient material loading position. The power driven conveyor means may comprise auger means having a hopper arranged adjacent the lower end of the auger to receive the material to be pumped for conveyance by the auger means into the cone-shaped hopper and thereby into the pump to be operated on. The conveying means is constructed and defined for allowing access to the conveyor or the auger for cleaning and washing purposes. The auger functions not only to convey the material from its material hopper into the pump hopper but also as a result of the continuous agitation provided by the auger it functions to maintain the material in a mixed condition thereby eliminating the need for such agitators presently employed in conventional pumps of this type. The conveying means may be readily moved to a transport position once the pumping and cleaning operations are completed.

These and other features of the present invention may be more fully appreciated when considered in the light of the following specification and drawings, in which:

FIG. 3 is a detached, plan view of the conveying apparatus illustrated in FIG. 1, taken along the line 3—3 and illustrating the housing for the conveying apparatus in an open condition for cleaning purposes.

Figure 2:
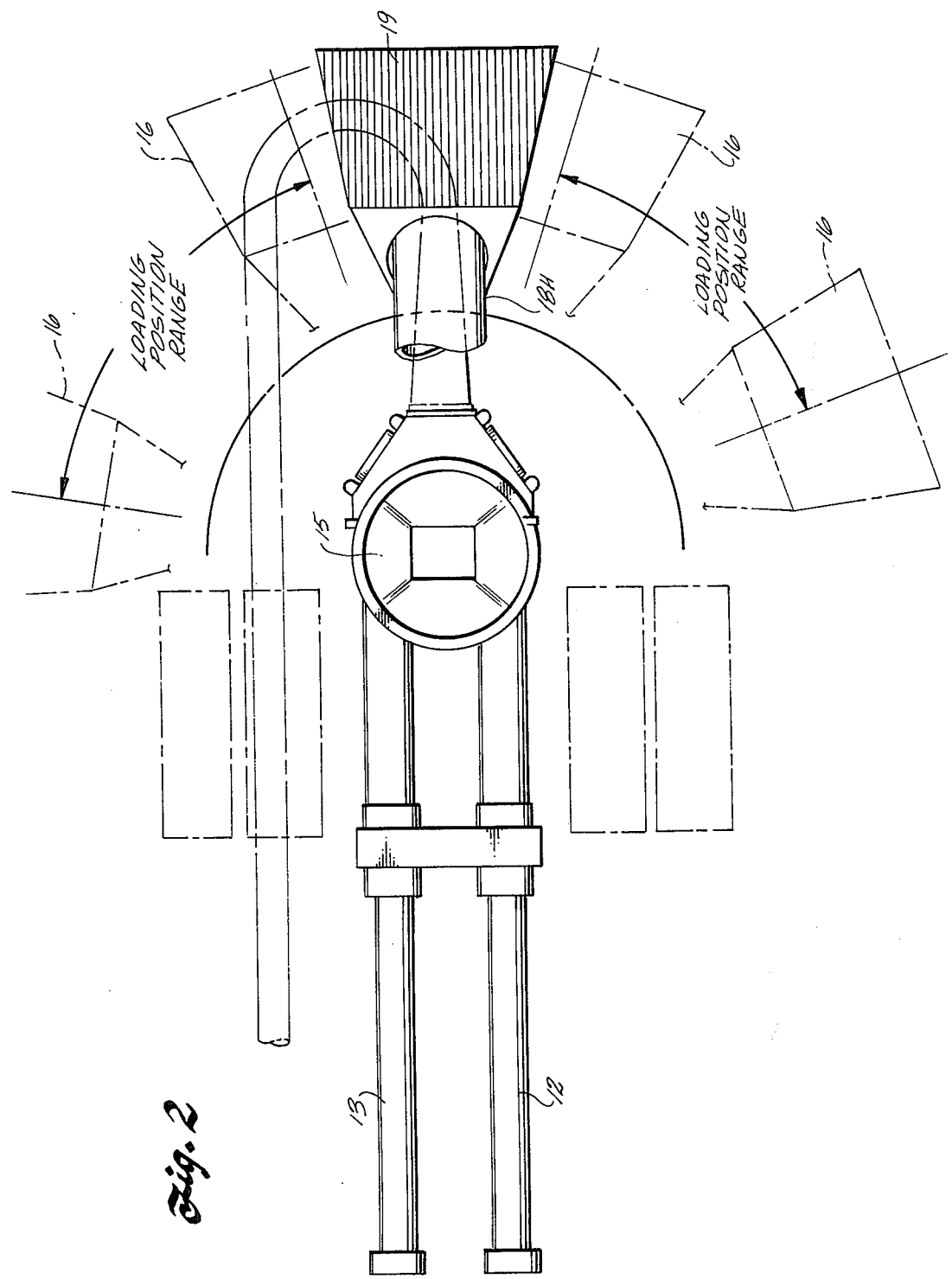
FIG. 2 is a partial top plan view of the mobile pump of FIG. 1 and illustrating the various loading positions of the conveying means in dotted outline.

The present invention will be discussed as it may be embodied in a mobile pump of the type disclosed and covered in U.S. Pat. No. 3,279,382 for pumping moist compressible materials such as plaster, concrete, mortar and the like. The details of the construction of the pump may be better appreciated by reference to U.S. Pat. No. 3,279,382 and the disclosure of that patent is incorporated herein by reference. For the purposes of the present invention it should be understood that the mobile pump disclosed by this prior art patent comprises a conventional motor vehicle or pick-up truck that is self-propelled and is adapted for powering the pump in accordance with the concepts disclosed in that patent. The motor vehicle or truck 10 employed in the present invention is an unmodified conventional pick-up truck that does not have its bed modified for the purposes of receiving and mounting a concrete pump. A concrete pump 11 is illustrated in FIG. 2 mounted on the truck 10 and is of the same general construction as the pumping apparatus disclosed in said U.S. Pat. No. 3,279,382. The pump 11 is mounted on the truck bed so as to be charged with the material to be pumped from a concrete ready-mix truck or the like.

The pump 11 includes a pair of pumping units 12 and 13 arranged longitudinally of the truck bed for pumping the material recevied from the material source or ready-mix truck as the material to be pumped is alternately conveyed into the pumping units 12 and 13 through the valving action provided by a material chamber 14. The chamber 14 may have an appropriate valve means such as the valve element 21 of U.S. Pat. No. 3,279,382 for causing the units 12 and 13 to alternately charge and discharge the material. The material chamber 14 employed in conjunction with the present invention may be of the same general construction as the concrete chamber 21a disclosed in U.S. Pat. No. 3,279,382 and receives the material to be pumped at the material inlet for the chamber and which inlet is identified as the inlet 16a in said prior patent. The improved conveying apparatus of the present invention for charging the material into the pump is coupled to the material inlet 16a for the chamber 14 and is identified as the inlet 16a in FIG. 1. For this purpose the material inlet 16a for the chamber 14 conveys the material to be pumped into the chamber by the provision of an upstanding material hopper 15 secured thereto for receiving the material to be pumped and delivering it to the material chamber 14 through gravity flow. For this purpose, the material hopper 15 may be constructed and defined as a cone-shaped hopper for funneling material to the material inlet 16a of the chamber 14 to cause the material to gravity flow into the chamber at the proper rate to allow the pumping units 12 and 13 to be operative thereon. For this purpose the material hopper 15 may have a cone volume of approximately 3 cubic feet. The material hopper 15 may be arranged at any convenient height above the chamber 14 to obtain the desired and necessary volumetric flow into the chamber 14 as contrasted with the height restrictions that are prevalent in prior art constructions.

Figure 1:
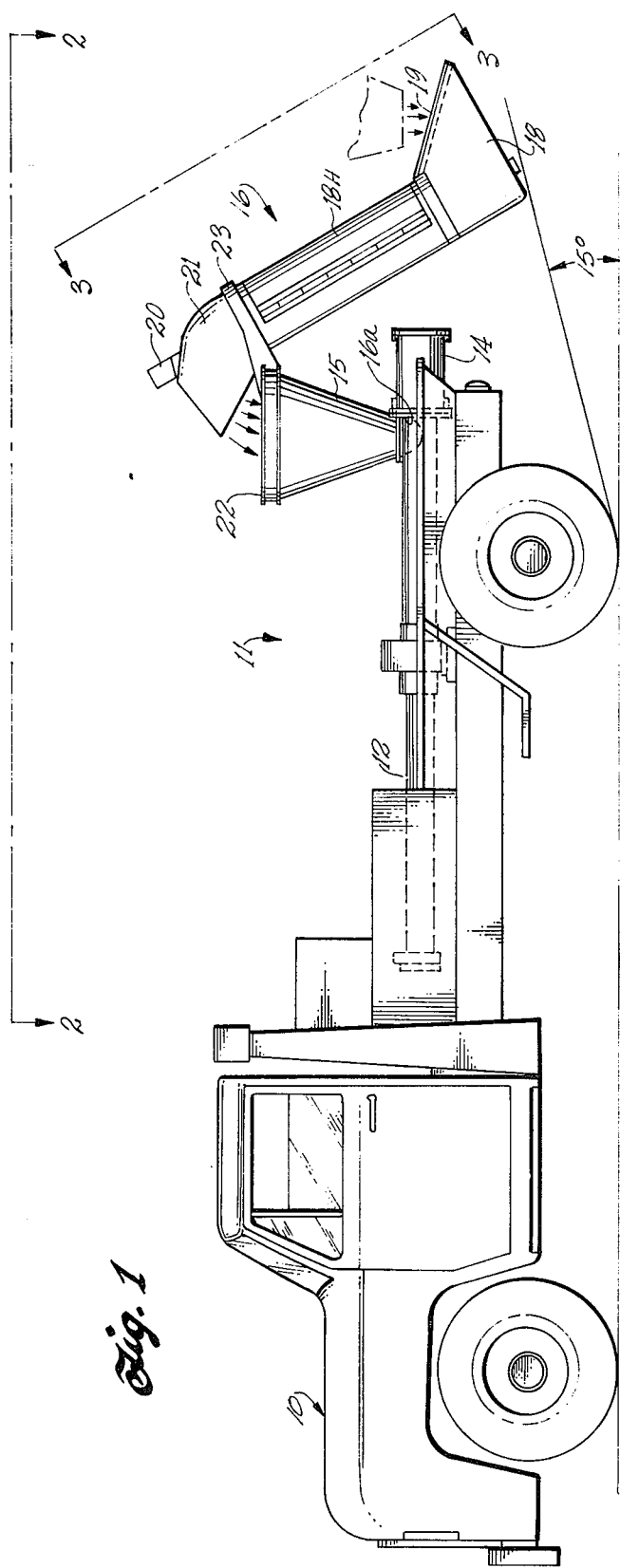
FIG. 1 is a diagrammatic side elevational view, with parts omitted, of a mobile pump embodying the present invention.

The material to be pumped that is received by the material hopper 15 is received from conveying apparatus 16 which is constructed to be carried by, and is movably secured to, the material hopper 15. The conveying apparatus 16 comprises an auger 17 provided with an individual material hopper 18 mounted adjacent the material entry end or the lower end of the auger 17 (as illustrated in FIG. 1) for receiving the material to be pumped for conveyance by the auger 17 upwardly and then discharged ino the material hopper 15. The hopper 18 is provided with a conventional material screen 19 mounted over the opening material entry end of the hopper 18 for preventing the entry of large rocks, stones, and similar foreign materials into the conveying apparatus 16 that may be mixed with the material received from a concrete truck or similar material source. To maintain the necessary volumetric flow of material to be pumped into the chamber 14 for proper operation of the pumping units 12 and 13, the hopper may be constructed and defined to have a volumetric capacity on the order of seven cubic feet. The auger 17 is coupled to be powered by motor means 20 which may be a hydraulic torque motor mounted at the opposite end of the auger 17 from the hopper 18 and is employed to drive the auger for conveying the material to be pumped at the proper rate into material hopper 15. The motor 20 is mounted on the outside of an enclosed material chute 21 construced and defined at the material discharge end of the auger 17 for restricting the flow of the material discharged from the auger 17 into the hopper 15; see FIG. 1.

To expedite the conveyance of the material to be pumped from a material truck in accordance with the various heights of the discharge apparatus of present day domestic and foreign concrete trucks, the conveying apparatus 16 is adapted to be carried by the hopper 15 and adapted to be movable or rotatable thereabout to provide various loading positions for the apparatus 16. For this purpose, the material hopper 15 is provided with a swivel collar 22 that rotatably mounts the conveying apparatus 16 through the provision of a swivel bracket 23. The swivel bracket 23 is adapted to rotatably ride on the swivel collar 22 so as to be positioned at various radial locations with respect to the hopper 15. The various material loading positions are illustrated in dotted outline in FIG. 2. The conveying apparatus 16 may be locked into position once a convenient loading position has been selected for the conveying apparatus during the transfer of the material from a concrete truck to the concrete pump 11, for example.

The conveying apparatus 16 extends outwardly from the hopper 15 at an inclined relationship so that the lowest point of the conveyor hopper 18 allows present day domestic and foreign ready-mix concrete trucks to readily discharge their load therein. This height as illustrated in FIG. 1 is 36 inches with the opposite corner of the hopper having an angular relationship with respect to ground level of approximately fifteen degrees, as illustrated. With these relationships the conveyance of the material by the auger 17 delivers the material to the pump 11 at a proper volumetric flow rate for efficient pumping action.

Now referring to the enclosure for the auger 17, it will be noted that the auger 17 is housed in a cylindrical housing 18H completely enclosing the auger 17. The cylindrical housing 18H is provided with a movable door or a flap 18D which is hinged by means of a piano hinge 18E, or the like, to allow it to be swung to an open position to expose the auger 17 as can be best appreciated by referring to FIG. 3. The door 18D may be latched in a closed position by means of any conventional latching mechanism such as the illustrated arrangement of nuts and bolts secured to the stationary portion of the housing 18H at opposite ends of the door opening and identified as the latching elements 24 and 25. These elements coact and secure the female elements 24D and 24E secured to the door 18D as can be readily appreciated by those skilled in the art. This construction provides for the exposure of the auger 17 and allows the auger and the housing to be readily cleaned and washed after the termination of the pumping operations to prevent the moist compressible materials from hardening thereon. The facility with which the conveying apparatus may be cleaned allows the apparatus and the associated pump 11 to be readily utilized for future pumping operations without any substantial loss of productive time.

An important aspect of the present invention is the dual function afforded by the auger 17. In the present day pumping apparatus for pumping moist compressible materials such as concrete, the tendency of the aggregate to separate and settle out from the remaining elements of the material to be pumped is prevented through the use of mixing paddles to remix the materials during the transit interval from the ready mix truck to pump proper. In accordance with this invention the mixing paddles normally employed in the pump material hopper have been eliminated as the result of the continuous agitation of the material provided by the auger 17 during its conveyance interval into the hopper 15. This allows the additional cost required to provide the conveying apparatus 16 for the pump to be partially offset as a result of the elimination of the mixing paddles therefore. In addition, offsets are realized in avoiding the necessity for modifying the conventional truck bed and allowing the pump 11 to be readily mounted on the truck bed. Similar cost offsets may be realized in the over-all construction of the concrete pump which may completely offset the costs attendant to the adoption of the conveying apparatus 16, thereby providing a pump 11 that is more adaptable for use and more desirable.

What is claimed is:

1. As an article of commerce, conveying apparatus for conveying moist, compressible materials such as plaster, concrete, mortar and the like as received from a mobile material mixing device having material discharge means for conveyance to a material pump wherein the material inlet for the pump is at a height above the material discharge means of the mixing apparatus so that the material may not be readily discharged from the mixing device into the pump, the article of commerce comprising a pump for pumping moist compressible materials and having means integral therewith for receiving the material to be pumped and having a fixed, preselected height above the ground level of the pump, and conveying means mounted at one end to the material receiving means for the pump to be carried thereby and extendable outside of the pump for readily conveying the material from the mixing apparatus to the receiving means, the conveying means being constructed and defined to be rotatably extendable at an inclined relationship to the pump to a preselected point below the height of the pump receiving means and to be rotated to a position to facilitate receiving the material at the free end thereof from said mobile material mixing device, said material receiving means comprising an upstanding material hopper having means for rotatably mounting said conveying apparatus adjacent the upper rim of the hopper, said rotatable mounting means comprises swivel collar means mounted adjacent the upper rim of the hopper for rotatably mounting said conveying means to permit the conveying means to rotatably ride on the swivel collar means for permitting the conveying means to be positioned at various radial material loading positions with respect to the upper rim of the hopper.

* * * * *